(12) United States Patent
Morris et al.

(10) Patent No.: US 7,548,906 B2
(45) Date of Patent: Jun. 16, 2009

(54) BUCKET-BASED SEARCHING

(75) Inventors: Ronald A. Morris, San Francisco, CA (US); Charles J. Migos, San Francisco, CA (US); Yi Linda Chan, San Jose, CA (US); David H. Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/426,209

(22) Filed: Jun. 23, 2006

(65) Prior Publication Data

US 2007/0299842 A1    Dec. 27, 2007

(51) Int. Cl.
*G06F 7/00* (2006.01)
(52) U.S. Cl. .......................................... 707/3
(58) Field of Classification Search ................. 707/3
See application file for complete search history.

(56) References Cited

U.S. PATENT DOCUMENTS

| | | | |
|---|---|---|---|
| 5,845,278 | A | 12/1998 | Kirsch et al. |
| 6,006,225 | A | 12/1999 | Bowman et al. |
| 6,968,332 | B1 | 11/2005 | Milic-Frayling et al. |
| 6,970,859 | B1 | 11/2005 | Brechner et al. |
| 7,181,438 | B1 * | 2/2007 | Szabo ............................ 707/2 |
| 2001/0051911 | A1 | 12/2001 | Marks et al. |
| 2002/0078019 | A1 | 6/2002 | Lawton |
| 2002/0103876 | A1 | 8/2002 | Chatani et al. |
| 2004/0078224 | A1 | 4/2004 | Schramm-Apple et al. |
| 2004/0260802 | A1 | 12/2004 | Elsey et al. |
| 2005/0125397 | A1 | 6/2005 | Gross et al. |
| 2005/0209992 | A1 * | 9/2005 | Kikinis et al. .................. 707/1 |
| 2006/0004724 | A1 | 1/2006 | Tabata et al. |
| 2006/0101503 | A1 * | 5/2006 | Venkataraman et al. ..... 725/136 |

FOREIGN PATENT DOCUMENTS

WO    WO2005029358    3/2005

OTHER PUBLICATIONS

Gupta, et al., "Robust One-Class Clustering using Hybrid Global and Local Search," available at <<http://www.machinelearning.org/proceedings/icml2005/papers/035_Robust_GuptaGhosh.pdf>>, 8 pages.
Rogers, "Beyond Site Search Helping Users to 'Find'," available at <<http://www.ektron.com/ceonotes.aspx?id=2046>>, accessed on Apr. 11, 2006, 4 pages.
Zhao, et al., "A Meta-Search Method with Clustering and Term Correlation," available at <<http://www.cs.ust.hk/~dlee/Papers/www/server-rank-dasfaa04.pdf>>, 11 pages.

* cited by examiner

*Primary Examiner*—Charles Rones
*Assistant Examiner*—Fazlul Quader
(74) *Attorney, Agent, or Firm*—Lee & Hayes, PLLC

(57) ABSTRACT

An item discovery module (IDM) is described that allows a user to find one or more desired items within a store of candidate items. In operation, the user enters a search selection, upon which the IDM determines a collection of matching items. The IDM groups the matching items into one or more buckets, each bucket including one or more items. The IDM then selects representative items for the respective buckets and presents the representative items to the user. The representative items assist the user in converging on the one or more desired items. Namely, the user may enter another search selection which targets an identified bucket, upon which the above-described procedure is repeated.

14 Claims, 7 Drawing Sheets

| | | |
|---|---|---|
| | B | ⋮ ⋮<br>402<br>Abe Johnson<br>Abbey Jones<br>Abigail Crawford<br>Abraham Goldman |
| Search A | L | 404<br>Alberta Gonzales<br>Alice McCoy<br>Alicia Kennedy<br>Allison Patterson} 408<br>Allison Swason<br>⋯ } 406 |
| | M | Amanda Higgins<br>Amanda Washington<br>Amanda Simpson<br>Amie Jenkins<br>Amy Smith<br>⋯<br>⋮ ⋮ |

FIG. 4

BUCKET-BASED SEARCHING

BACKGROUND

Search tools allow a user to locate one or more desired items from a larger collection of items. In some instances, the user is able to formulate a search term that quickly pinpoints a desired item. In other instances, however, the user may have more difficulty finding the desired item. For instance, the user may be unsure whether the collection even contains the desired item. In this case, the user's initial search term will obviously fail to retrieve the desired item. Or the item may exist in the collection, but the user may have difficulty in formulating a search term which is successful in finding this item. For instance, the user may wish to locate a movie staring a particular artist, Alyson Jones, by typing in the search term "Allison Jones." This search terms may fail to locate the desired movie. When confronted with an unsuccessful search, the user may opt to enter another search term, essentially starting over from "scratch."

In more general terms, known search tools, in some instances, may not effectively steer or guide the user in finding a desired item. This problem may become more pernicious with large data stores, as the user may have more difficulty sifting through a large amount of items to find a desired item.

In other cases, the user may know the precise search term that will locate a desired item, such as the name of the actress "Alyson Jones." However, as appreciated by the present inventors, a user may find that typing in the full search term "Alyson Jones" is a tedious and error-prone task. This difficulty may be exacerbated in those cases in which the user is entering a search term using a device with a limited input mechanism (such as in the case of a remote controller, mobile telephone, etc.).

For at least the above-stated exemplary reasons, there is a need for more effective techniques for finding items within a larger collection of items.

SUMMARY

The following description sets forth an item discovery module (IDM) that allows a user to find one or more desired items within a store of candidate items, such as a database of information pertaining to media resources. In operation, the user enters a search selection, upon which the IDM determines a collection of matching items. The IDM groups the matching items into one or more buckets, each bucket including one or more items. The IDM then selects representative items for the respective buckets and presents the representative items to the user. The representative items assist the user in converging on the one or more desired items. For instance, the user may enter another search selection which targets an identified bucket, upon which the above-described procedure is repeated in the context of the collection of items within the identified bucket.

In one specific exemplary implementation of the IDM, the user may begin by entering a search selection in the form an alphanumeric character, such as the letter "A." The IDM responds by identifying one or more items that start with "A." The IDM can then group the matching items into different buckets. Items within a given bucket share a common characteristic. For instance, a first bucket may identify items that have the initial characters "AB," a second bucket may identify items that have the initial characters "AL," and so on. The IDM can then select a representative item from each bucket based on a selection criterion. For instance, the IDM can arrange the items in a bucket in alphabetical order or a popularity-based order, etc., and then select the first item in this ranking as the representative item for this bucket. The representative items guide the user in deciding what search selection to make next. For example, the user can further investigate the bucket associated with the characters "AB" by next entering the search selection "B."

According to another exemplary feature, the IDM can display information which conveys the number of items included in the respective buckets.

In another exemplary implementation, the IDM can display plural representative items for each bucket. In one variation of this implementation, the IDM can display all of the members of each bucket. The IDM can emphasize one or more representative items in each bucket according to any consideration or combination of considerations.

According to another exemplary feature, to further guide the user in making a subsequent search selection, the IDM can present index items associated with the buckets. An index item identifies the common characteristic (or theme) of a bucket. For instance, a bucket that includes items that have the initial characters "AB" can be assigned the index item "B," as this is the letter which distinguishes this bucket from other buckets. This index item also guides the user in determining her next search selection. For example, if the user wishes to target the "AB" bucket, she may enter the search selection "B" in the manner described above.

According to another exemplary feature, the IDM does not populate the search results with index items (and corresponding representative items) if there are no items in the store that correspond to these index items. In the above illustrative scenario, for example, the IDM would not present the index item "C" if there are no items in the store 19 that begin with the initial characters "AC."

The IDM confers a number of benefits. According to one general benefit, the IDM potentially improves user experience in performing a search because the user is effectively steered through the search process based on the "hints" provided by the index items and representative items. The user is thereby rescued from the situation in which she must make blind guesses in entering search terms, some of which are met with the ubiquitous message "No search results. Try again."

According to another exemplary benefit, the user can find a desired item without necessarily typing in a complete search term. That is, the IDM can reveal the desired item in response to the user entering only one or more initial characters of the desired item.

This Summary section refers to exemplary and informative manifestations of the subject matter described herein, and hence in no way should be construed as limiting the scope of the invention set forth in the Claims section.

BRIEF DESCRIPTION OF THE DRAWINGS

FIG. 4 shows an exemplary variation of the user interface presentation of FIGS. 2 and 3.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for discovering items in a larger collection of items. The strategies are manifested in systems, computer-readable media, methods, and so on.

A. Exemplary Appearance and Behavior of the User Interface Presentations (FIGS. 1-4)

In the following discussion, the functionality that implements discovery within a store of items is referred to as an item discovery module, referred to for brevity by the abbreviation IDM. This section (Section A) explains the IDM in the general context of its conceptual framework and the user interface presentations that it produces. The next section (Section B) describes the exemplary structural composition of the IDM. The last section (Section C) describes the procedural aspects of the IDM in flowchart form.

A.1. Overview of Exemplary Discovery Strategy (FIG. 1)

Figure 1:
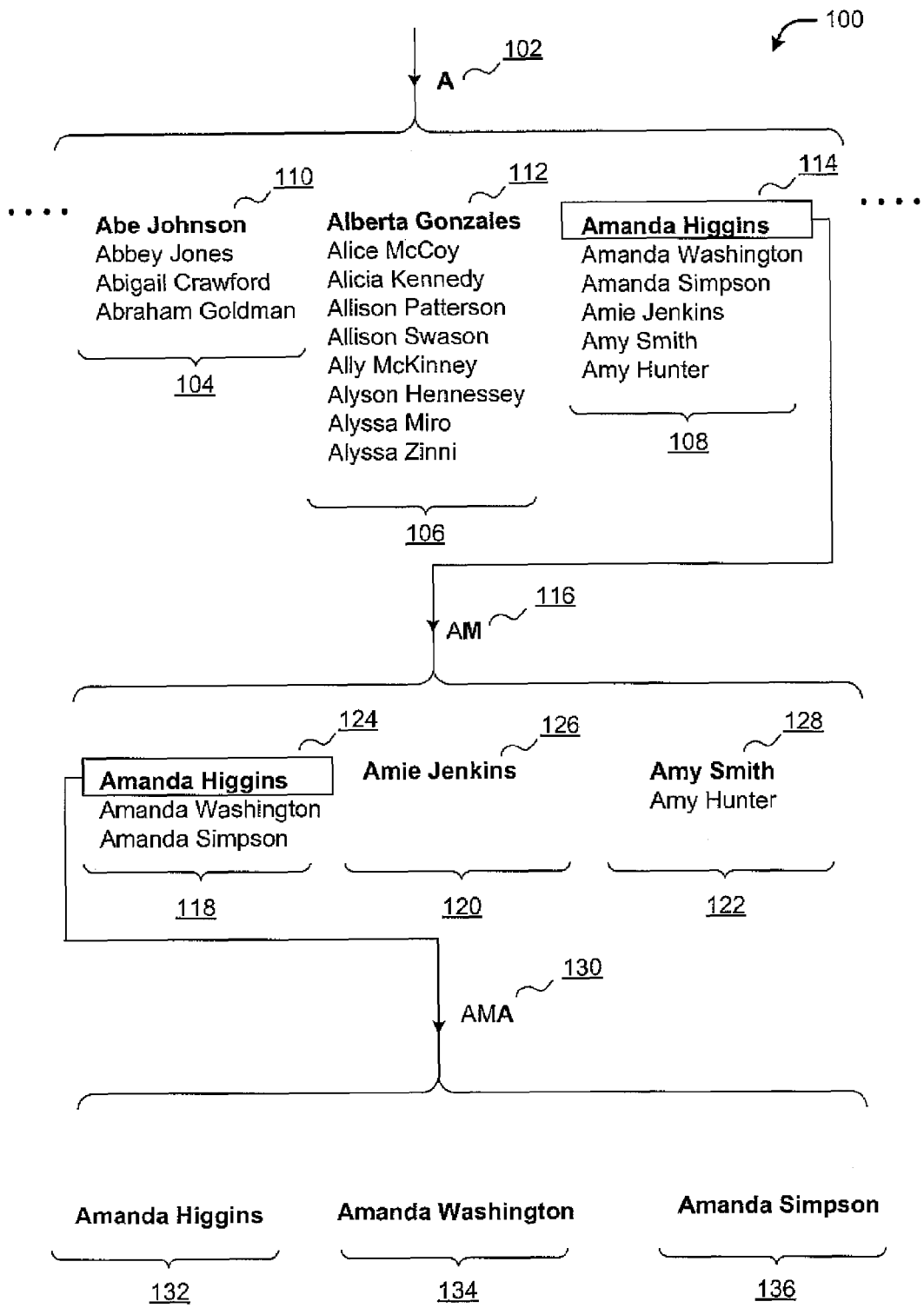
FIG. 1 shows an overview of an exemplary bucket-based search strategy.

FIG. 1 shows an overview of an exemplary strategy 100 employed by the IDM for navigating through a store of items. The items may correspond to media resources. The media resources, in turn, may correspond to any kind of AV content (television programs, movies, etc.), music, games, and so forth. In one application, the term "items" may specifically refer to alphanumeric information that pertains to the media resources, such as titles of the resources, artists featured in the resources, and so on. However, it is to be understood that the functionality described herein can be applied to any type of information that describes any kind of resource.

By way of overview, in the strategy 100, the user enters a succession of search selections. After each search selection is entered, the IDM determines the items in the store that match the search selection. The IDM groups these matching items into one or more buckets, where each bucket may include one or more items. The items in each bucket share one or more common characteristics. The IDM then selects representative items for the respective buckets and displays the representative items to the user. As the name suggests, the representative items serve as representatives for other items within the buckets that are not displayed.

The user can use the representative items as a guide in determining what search selection should be entered next. Upon entry of the next search selection, the IDM repeats the above-described procedure, where items in a selected bucket are divided into smaller buckets based on the search selection. In general, the IDM allows the user to successively converge on one or more desired items in the store of items, with the representative items steering the user through the search process. Further, the IDM may allow the user to find a desired item by only typing in a few characters associated with the desired item.

FIG. 1 makes the above discussion more concrete with a specific example. Assume that the user is interested in finding the name of an actress ("Amanda Simpson") within a store of movie artists. Perhaps, for instance, the user is interested in finding this item so as to purchase a movie by this artist, discover further information about this artist, and so on. However, assume that the user may initially be unsure about the spelling of this person's name.

The user begins by entering a first search selection 102, which identifies the first letter of the artist's name, namely, the letter "A." This prompts the IDM to determine all of the items in the store which match the search selection, that is, all items which begin with the letter A. Further, the IDM groups the matching items into one or more buckets (104, 106, 108). In this exemplary case, the IDM looks to the second letter in the items as a basis for grouping the items. For example, the bucket 104 groups together all of the matching items that have the letter "B" as a second letter. The bucket 106 groups together all of the matching items that have the letter "L" as a second letter. The bucket 108 groups together all of the matching items that have the letter "M" as the second letter, and so on. Further note that no buckets are allocated if such buckets would have no members. For example, no item in the matching collection of items has "C" as a second letter, and therefore, the IDM does not allocate a bucket for the letter "C." This is beneficial because the IDM does not clutter its presentation with search options that will not lead to meaningful paths of discovery.

According to another feature, in one case, the IDM does not present all of the items in the buckets (104, 106, 108), but selects one item from each bucket and presents this item as a representative item. In the exemplary illustrated (but non-limiting) case, for each bucket, the items are placed in alphabetical order and the top-most item is chosen as the representative item. In the example of FIG. 1, the respective representative items for buckets 104, 106, and 108 are items 110, 112, and 114.

At this juncture in the procedure, the user makes another search selection based on guidance provided by the representative items (110, 112, 114). For instance, the user will recognize that the bucket 108 represented by the representative item 14 ("Amanda Higgins") is likely to include the desired item (i.e., the name of the artist "Amanda Simpson") because this bucket 108 groups together items that begin with the letters "AM." Therefore, the user selects this bucket 108. In one implementation, the user can select this bucket 108 by inputting another search selection 116. In this case, the user enters the letter "M" to target the bucket 108 because the letter "M" is the theme of this bucket 108.

Entering the new search selection 116 prompts the IDM to generate another series of buckets (118, 120, 122). The new buckets (118, 120, 122) include items taken from the above-described "Amanda Higgins" bucket 108. In performing this grouping, the focal point is now the third letter in the items. Bucket 118 groups together all of the matching items (from the bucket 108) that have the letter "A" as the third letter, Bucket 120 groups together all of the matching items that have the letter "I" as the third letter. Bucket 122 groups together all of the matching items that have the letter "Y" as the third letter. Bucket 118 is represented by representative item 124. Bucket 120 is represented by representative item 126. And bucket 122 is represented by representative item 128.

In a similar manner to that described above, the user may select one of these buckets (e.g., by entering a third search selection 130 that specifies the letter "A"). This prompts the IDM to generate yet another series of buckets (132, 134, 136) drawing from the "Amanda Higgins" bucket 118. At this point, the user notices that the desired item, i.e., the name of the actress "Amanda Simpson," defines a separate bucket 136. Since the user has now found the desired item, the user has effectively completed a search operation. The user may activate the "Amanda Simpson" item to purchase movies or TV programs that feature this artist, to find out more information about this artist, and so forth.

To repeat, the implementation of the strategy 100 described above is exemplary and non-limiting. The strategy 100 can be modified in various ways. In one variation, the IDM can use other criteria to generate buckets (such as non-alphabetical criteria). In another variation, the IDM can use multiple criteria to generate buckets. In another variation, the IDM can vary the criteria that it uses to generate buckets in the course of a search operation. Still other variations are possible.

According to another variation, instead of selecting a representative item based on an alphabetical ordering of items in a bucket, the IDM can select the representative item based on a popularity-based ordering. That is, the IDM can determine the popularity of each item in a bucket. The popularity for an item can be gauged in different ways, such as by determining how many times users have selected this item in prior searches. The IDM can select the item with the highest popularity rating as the representative item for the bucket.

According to another variation, the IDM selects a representative item based on marketing-related considerations. For example, assume that a particular merchant offers a collection of video-on-demand (VOD) assets that may be selected from a larger collection of VOD assets provided by other merchants. This merchant can pay a fee to ensure that, when one of its items appear as a member of a bucket, the IDM will select this item as the representative item (regardless of alphabetical or popularity ordering considerations). If multiple merchants have paid fees to ensure favorable treatment, the IDM can award the representative item slot to the highest paying merchant, or can award this slot to all of the paying merchants on a round-robin basis, and so on.

Still other bases for selecting representative items can be used.

According to another variation, the IDM can select and display plural representative items for each bucket. Indeed, the IDM can identify all of the members of each bucket as representative items, which results in the display of all of the items in each bucket. The IDM can emphasize one or more representative items in each bucket based on any consideration or combination of considerations. For example, the IDM can rank the representative items based on any criterion (or combination of criteria) and then display the items based on their respective rank.

A.2. Exemplary User Interface Presentations (FIGS. 2-4)

The strategy 100 shown in FIG. 1 can be implemented by different types of user interface presentations. FIGS. 2 and 3 show one exemplary and non-limiting user interface presentation 200 that can be used to implement the strategy 100.

Figure 2:
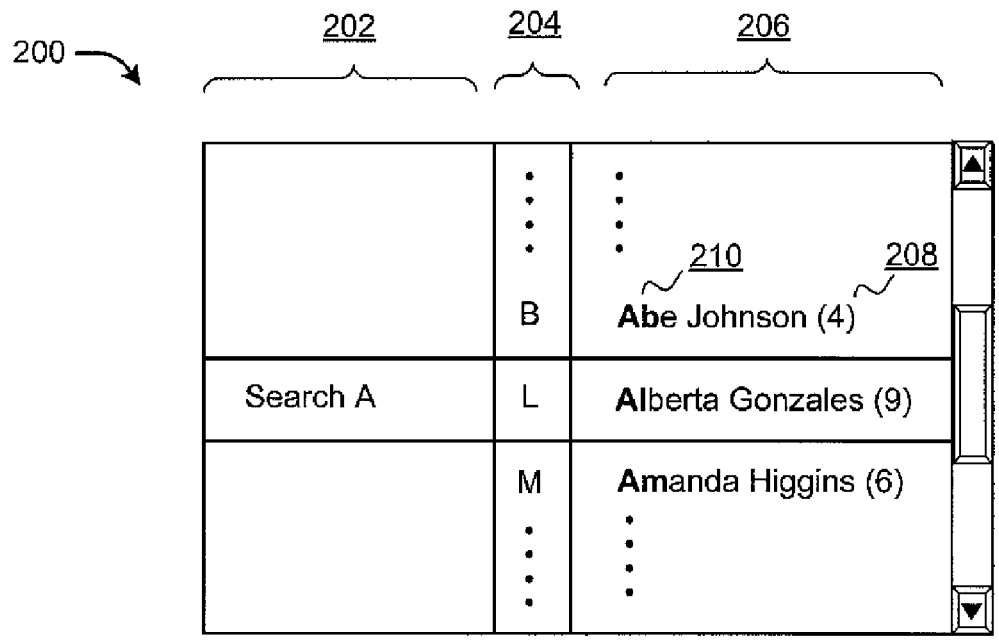
FIGS. 2 and 3 show an exemplary user interface presentation that can be used to implement the search strategy of FIG. 1.
Figure 3:
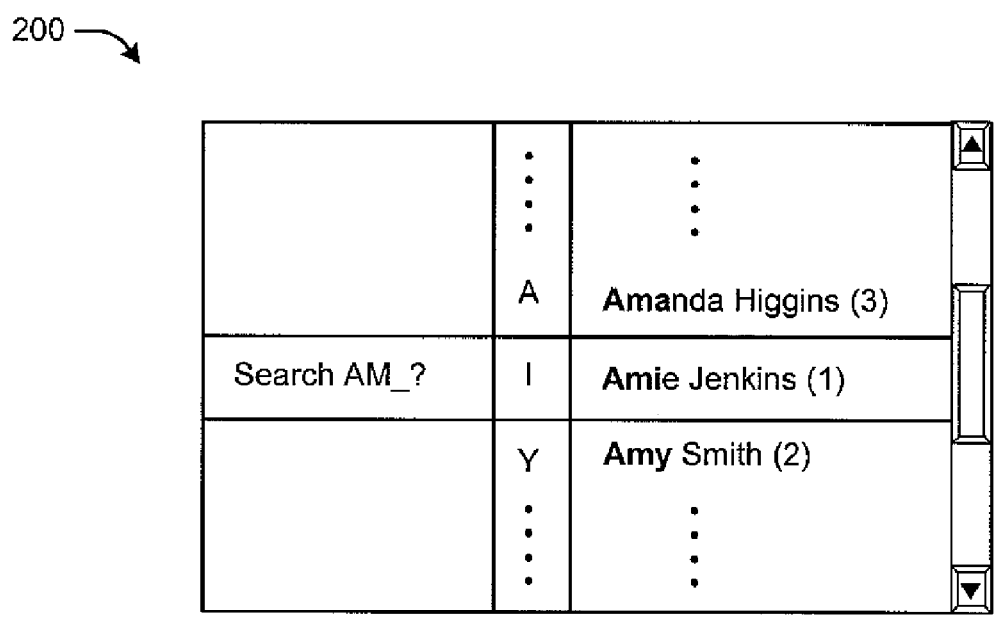

With reference first to FIG. 2, the user interface presentation 200 includes three sections. A first section 202 includes an input field for receiving successive search selections, e.g., in the example featured in FIG. 1, the letters "A," "M," and then "A."

A second section 204 includes an index item. That is, there is an index item for each bucket. The index item for a bucket characterizes the bucket, meaning that the index item distinguishes the bucket from other buckets. Consider the bucket 104 of FIG. 1, denoted by the representative item "Abe Johnson" 110. This bucket 104 includes items having "B" as a second letter. Thus, as shown in FIG. 2, the index item for this bucket 104 is the letter "B." The other index items shown in FIG. 2 are "L" for group 106 and "A" for group 108. In addition to characterizing the buckets, the index items also serve as hints regarding what search selection can be entered next by the user. For instance, in this example, the user decides to target the "Amanda Higgins" bucket 108, and therefore enters the index item for this group ("M") as the next search selection.

As shown in FIG. 3, entry of the letter "M" prompts the IDM to update the user interface presentation 200 to include representative items (124, 126, 128) for the next tier of buckets (118, 120, 122). The above-described selection process can continue until the user arrives at one or more desired items, such as the name of the actress "Amanda Simpson."

The user interface presentation 200 can optionally convey the number of items in each bucket. One way of implementing this feature is to display the number of items next to the representative item of a bucket. For example, a number field 208 supplements the representative item 110 of the bucket 104. The IDM can alternatively convey numeric information using non-numeric symbols (e.g., by showing a number of dots corresponding to the number of items in the bucket), using graphical depictions, altering the size of the font of the representative item, and so on.

The user interface presentation 200 can also convey the "theme" or "topic" of a bucket in various ways, such as by highlighting the salient letters of the bucket's representative item. For instance, by virtue of highlighting 210, the user is informed that the "Abe Johnson" bucket 104 groups together items that have the initial two characters Of "AB."

As a final note, the user interface presentation 200 displays the index items and the associated representative items in alphabetical order. However, the user interface presentation 200 can use other criteria to order these items, such as popularity of items, etc. In one case, the user interface presentation 200 can be configured to initially highlight the index item and representative item pair that it determines that the user will most likely select next (e.g., based on empirical data gleaned from prior selections by users).

FIG. 4 shows another user interface presentation 400 in which the IDM presents plural representative items for each bucket. For example, in this illustrative case, the IDM can display five representative items from each bucket, although the IDM can also display all of the members in each bucket.

Consider the bucket 402, characterized by items that have the first two initial characters "AB." In this example, the IDM displays all of the members of this bucket 402 as representative items. The IDM can rank the items in the bucket 402 based on one or more factors, and then display the items in such a manner that conveys the ranking to the user. In the exemplary case of FIG. 4, the IDM ranks the representative items in the bucket 402 in alphabetical order and then displays the highest-ranked item as the top-most member of the bucket 402. Other ways of ranking the items can be used. Further, other ways of visually conveying the ranking can be used.

Consider next the bucket 404. The IDM displays only the first five items in this bucket as representative items. The IDM can convey the fact that additional items exist in this bucket 404 in various ways, such as by the notation " . . . " 406. Also note that the highest-ranked item in the alphabetically-ordered bucket 404 is the name "Alberta Gonzales." Accordingly, the IDM can display this item as the top-most item. Yet, based on marketing considerations and/or other factors, the IDM may also wish to promote one or more other items in the bucket 404. In the illustrative case of FIG. 4, the IDM promotes the name "Allison Patterson" 408 by displaying this name in boldface. For example, a movie studio may have paid a fee to promote the name Allison Patterson 408 (e.g., because this studio may have produced several movies by this actress and wishes to entice users to watch these movies).

B. Exemplary System (FIGS. 5-8)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware that can be configured to implement prescribed functions. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The term "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

B.1. Exemplary List Navigation Module (IDM) (FIG. 5)

Figure 5:
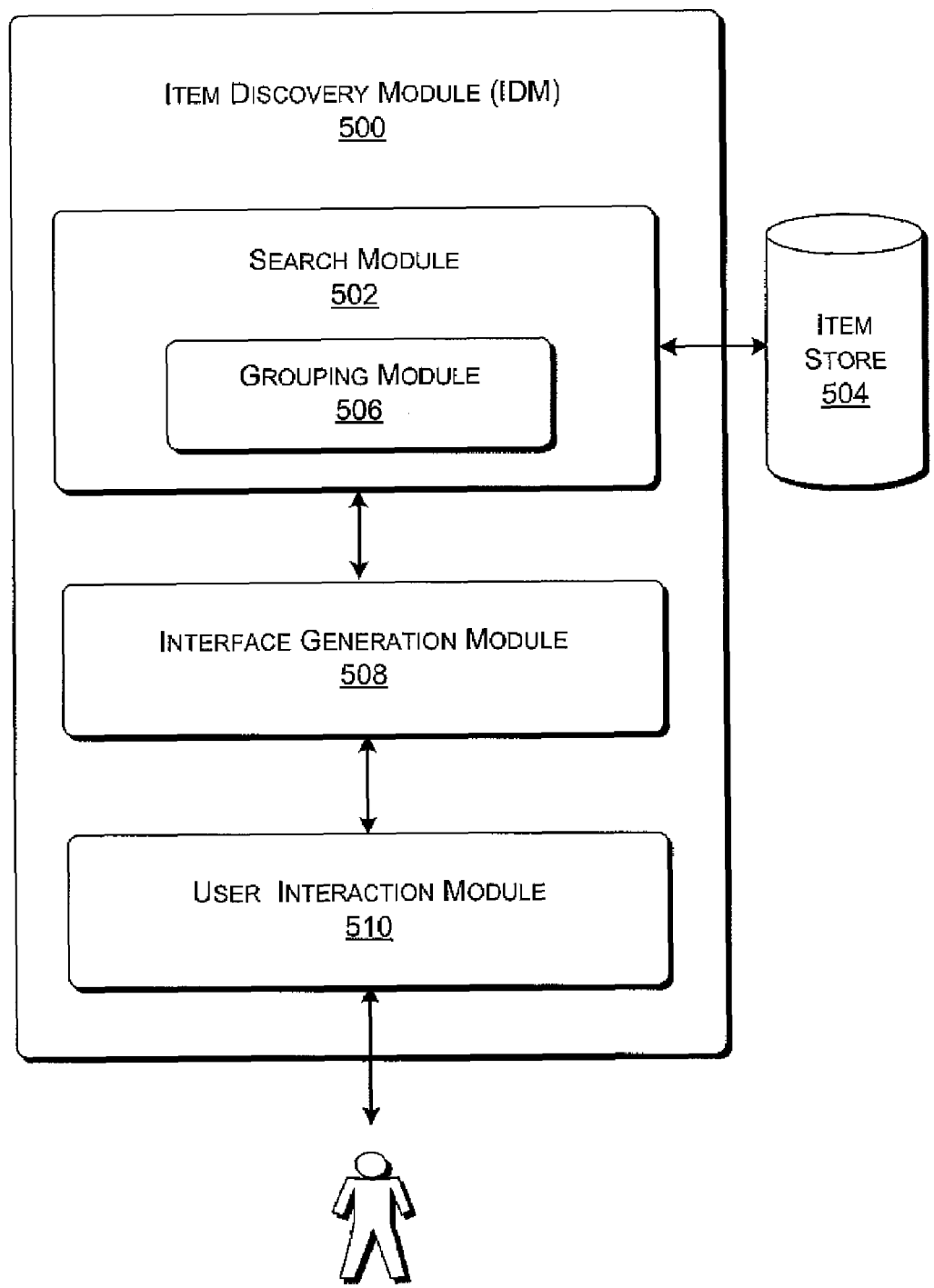
FIG. 5 shows an exemplary item discovery module (IDM) that can be used to implement the search strategy of FIG. 1.

FIG. 5 shows an exemplary composition of an item discovery module (IDM) 500. As explained above, the purpose of the IDM 500 is to allow a user to investigate a collection of items in an orderly and guided manner, to thereby improve user experience.

The IDM 500 includes a search module 502 that executes the core navigation behavior described in Section A. The search module 502 can act on items stored in a store 504, which may comprise a database or any other kind of repository of searchable information. The store 504 may represent a single store of information or multiple distributed stores of information. One purpose of the search module 502 is to identify items in the store 504 that match the user's search selection and then to group these items into one or more buckets, and then to select representative items to be presented to the user from the buckets. To perform its grouping function, the search module 502 can include a grouping module 506.

The IDM 500 can also include an interface generation module 508 which formats the results of the search module 502 into one or more user interface presentations, such as the user interface presentation 200 of FIGS. 2 and 3.

Finally, the IDM 500 can also include a user interaction module 510 which allows a user to interact with the user interfaces created by the interface generation module 508.

Figure 6:
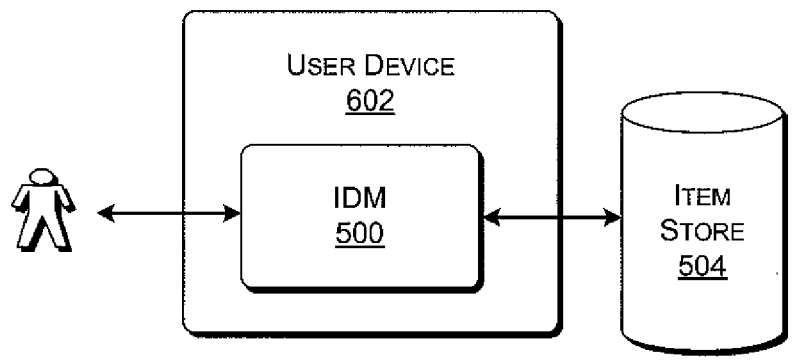
FIG. 6 shows one exemplary standalone system that can incorporate the IDM of FIG. 5.

B.2. Overview of Exemplary Systems that Incorporate the IDM (FIGS. 6-8)

The IDM 500 described above can be employed in many different environments. In the case of FIG. 6, the IDM 500 is used in a local standalone setting to navigate among items that can be locally archived in the store 504. In this case, for instance, the IDM 500 can be implemented by a personal computer, a personal digital assistant, a set top box, a digital video recorder (DVR), a mobile telephone device, a game console, and so on.

Figure 7:
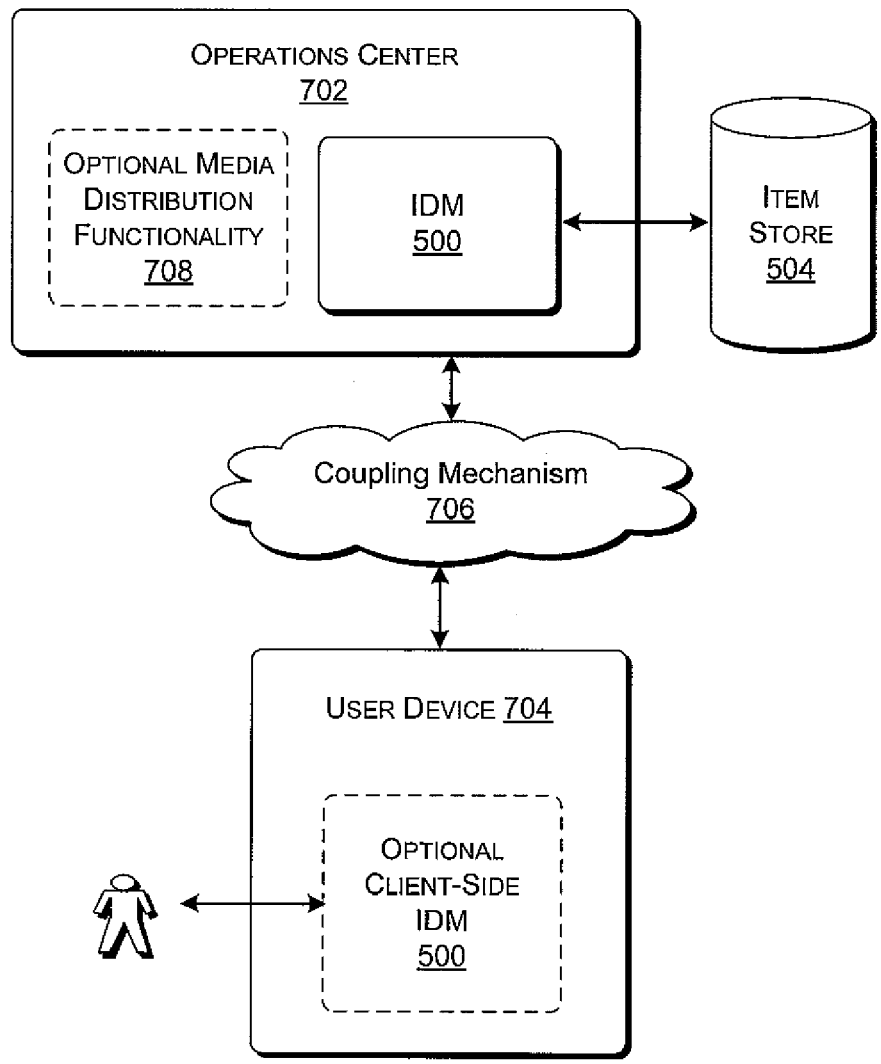
FIG. 7 shows one exemplary networked system that can incorporate the IDM of FIG. 5.
Figure 8:
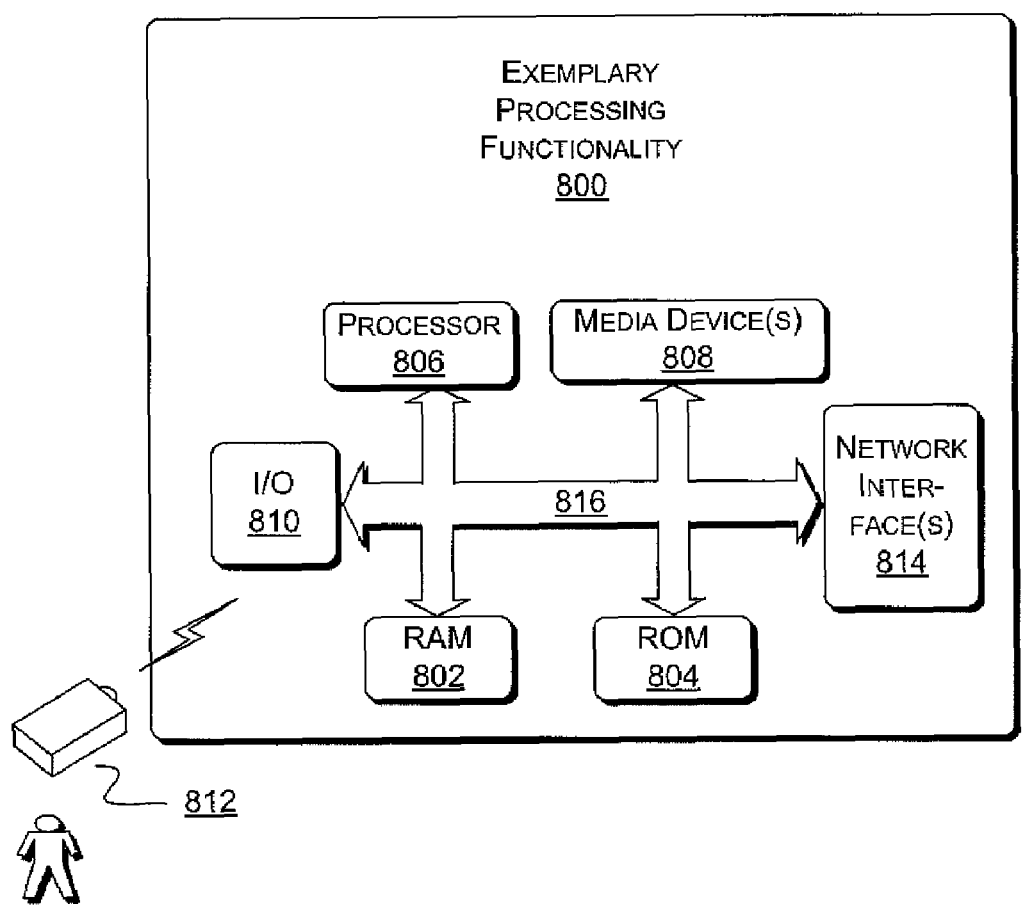
FIG. 8 shows exemplary processing functionality that can be used to implement any aspect of the systems of FIGS. 6 and 7.

In the case of FIG. 7, the IDM 500 can be used in a network environment in which an operations center 702 interacts with a user device 704 via any kind of network coupling mechanism 706 (such as a LAN, the Internet, and so on). For instance, the IDM 500 can be deployed as part of a search engine furnished by the operations center 702 to discovery items in the store 504. Alternatively, or in addition, the user device 704 can also incorporate aspects of the IDM 500 to execute the above-described navigation behavior on a local level. (In this scenario, the items stored in the store 504 can also optionally be stored at the local level, instead oft or in addition to, storage at the operations center level). The operations center 702 can be implemented by one or more server computers, located at a single site or distributed over plural sites. The user device 704 can be implemented in the manner described for FIG. 6 as a personal computer, a personal digital assistant, a set top box, a digital video recorder (DVR), a mobile telephone device, a game console, and so on.

In one type of networked environment shown in FIG. 7, the operations center 702 can include media distribution functionality 708. This functionality 708 can deliver streams of media information to the user device 704. In this environment, the IDM 500 can be used to assist the user in selecting media programs to be sent to the user device 704. For instance, the IDM 500 can be integrated with a search mechanism that allows a user to select video-on-demand (VOD) assets from a library of such assets. Or the IDM 500 can be integrated with an electronic program guide (EPS) mechanism that allows the user to select programs from an EPG listing of programs.

Still other applications and implementations of the IDM 500 are possible.

Various components of the systems shown in FIGS. 6 and 7 can be implemented by processing equipment, such as the user devices (602, 704) of FIGS. 6 and 7, any aspect of the operations center 702 of FIG. 7, and so on. FIG. 8 shows a general depiction of processing functionality 800 that can be used to implement any of these devices or modules.

The processing functionality 800 can include various volatile and non-volatile memory, such as RAM 802 and ROM 804, as well as one or processing devices 806. The memory (802, 804) can store instructions which perform the various functions described above when executed by the processing devices 806. The processing functionality 800 also optionally includes various media devices 808, such as a module for reading and writing information to a hard disk, and so forth. The processing functionality 800 also includes an input/output module 810 for receiving various inputs from the user, and for providing various outputs to the user. In the particular case of a media distribution environment, the user can interact with the input/output module 810 (of user device 602 or 704) using a remote control device 812. For instance, the remote controller 812 can allow the user to enter alphanumeric search selections and to move up and down in a display of representative items in the user interface presentation 200, as well as perform other input functions. (Hence, the input/output module 810 can be used, in part, to implement the user interaction module 510 of the IDM 500.) The output devices that interact with the input/output module 810 can include any kind of display device, printer, audio output device, and so forth. The processing functionality 800 can also include one or more interfaces 814 for exchanging data with other devices via a network. One or more buses 816 communicatively couple the above-described components together.

In various applications, the processing functionality 800 shown in FIG. 8 can include additional modules or can omit one or more of the modules shown in FIG. 8.

C. Exemplary Method of Operation (FIG. 9)

Figure 9:
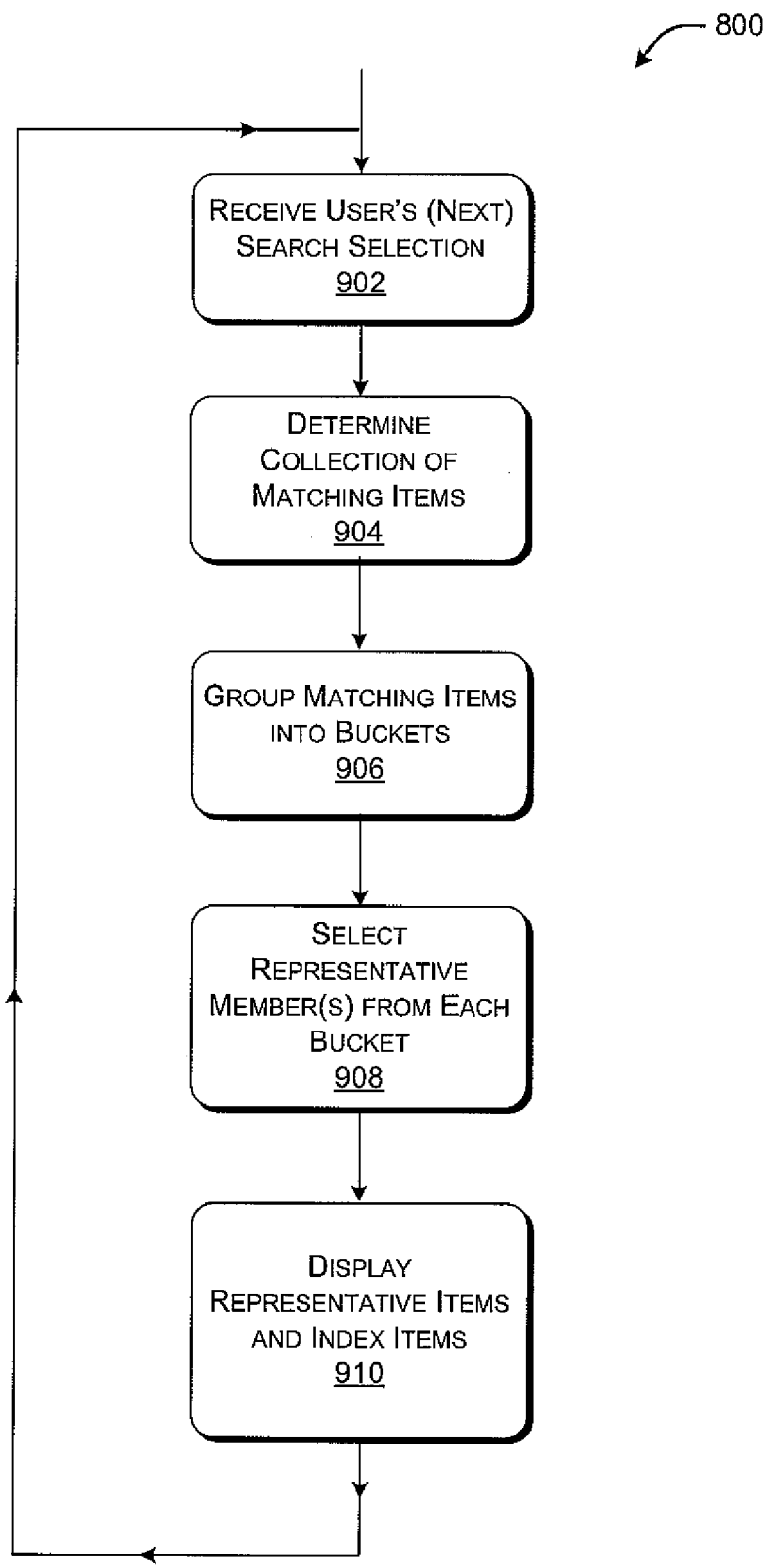
FIG. 9 shows an exemplary procedure that explains the operation of the IDM of FIG. 5.

FIG. 9 shows a procedure 900 which explains the operation of the IDM in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section C will serve primarily as a review of those functions.

In step 902, the IDM 500 receives the user's search selection. As explained above, this may comprise receiving an alphanumeric character.

In step 904, the IDM 500 determines a collection of items from the store 504 which match the search selection. Where the search selection defines one or more characters, step 904 may entail determining the items in the store 504 which include the same initial characters.

In step 906, the IDM 500 groups the collection of matching items (identified in step 904) into one or more buckets. The IDM 500 can use different criteria to perform this grouping function, such as by allocating buckets to items using a letter-based grouping criterion (as in the example of FIGS. 1-3).

In step 908, the IDM 500 selects representative members from the buckets to present to the user. The IDM 500 can use various criteria to select a representative item for a bucket, such as by selecting the top-most item in an alphabetical ordering of bucket entries, selecting the most popular item, and so on. In one case, the IDM 500 selects one representative item per bucket. In another case, the IDM 500 selects plural representative items per bucket.

In step 910, the IDM 500 displays the representative items that were determined in step 908. The IDM 500 can also display index items associated with the representative items. As explained above, the index items also guide the user in appropriate search selections that they may make next.

As indicated by the looping arrow shown in FIG. 9, the user can repeat the above described procedure by making another search selection, which prompts the presentation of additional representative items and index items. More generally, the user can repeat this procedure any number of items, each time narrowing a field of search until the user finds one or more items that meet his or her interest.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention. Further, identification of one or more needs in the relevant art(s) does not suggest that the subject matter described herein is limited to solving these needs; the subject matter may address additional needs.

Further, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for conducting a search for one or more desired items, comprising:
   receiving a user's search selection, wherein the user's search selection comprises an input of at least one alphanumeric character;
   determining a collection of items that match the search selection to provide matching items, wherein the matching items are items that include said at least one alphanumeric character;
   grouping the matching items into one or more buckets, each bucket including one or more items;
   selecting one or more representative items from each of the buckets to provide representative items; and
   presenting the representative items to the user, wherein the representative items assist the user in converging on the one or more desired items, wherein the presenting of the representative items comprises, for each bucket, presenting an index item for each bucket, wherein the index item: (i) comprises an alphanumeric character; (ii) identifies a distinguishing characteristic of the bucket, and (iii) identifies another search selection for the user to enter to narrow the search for the one or more desired items to items; and
   receiving another search selection that targets one of the buckets, and repeating the determining, grouping, selecting, and presenting with respect to a group of items associated with said one of the buckets.

2. The computerized method of claim 1, wherein the one or more desired items pertain to media resources.

3. The computerized method of claim 1, wherein the grouping comprises, for each bucket, identifying a group of items that have a common characteristic.

4. The computerized method of claim 3, wherein the common characteristic pertains, for each bucket, to one or more initial alphanumeric characters that are shared by the group of items within the bucket.

5. The computerized method of claim 1, wherein the selecting of the one or more representative items for each bucket comprises selecting one or more items based on one or more of:
   an alphabetical ordering of items within the bucket;
   a popularity ranking of items within the bucket; or marketing-based considerations.

6. The computerized method of claim 1, wherein plural representative items are selected for a given bucket, wherein the method further comprises emphasizing at least two of the plural representative items based on one or more considerations.

7. The computerized method of claim 1, wherein the presenting of the representative items comprises, for each bucket, presenting an indication of a number of items within the bucket.

8. One or more machine-readable media containing machine-readable instructions for implementing the computerized method of claim 1.

9. An item discovery storage module including logic configured to implement the computerized method of claim 1.

10. A computerized method for conducting a search for one or more desired items, comprising:
    presenting a list of representative items to the user, wherein the representative items respectively represent buckets, wherein each bucket includes one or more items that share a common characteristic;
    providing a list of index items to the user that are respectively associated with the buckets, wherein the list of index items omits any index item that does not have a counterpart bucket that includes at least one item;

receiving a search selection from a user, wherein the search selection is selected from one of the list of index items and comprises at least one alphanumeric character; and receiving another search selection that targets one of the buckets, and repeating the presenting, providing and receiving with respect to a group of items associated with said one of the buckets.

11. One or more machine-readable media containing machine-readable instructions for implementing the computerized method of claim 10.

12. An item discovery storage module including logic configured to implement the computerized method of claim 10.

13. One or more machine-readable storage media containing machine-readable instructions for implementing the computerized method, the method comprising:

receiving a user's search selection, wherein the user's search selection comprises an input of at least one alphanumeric character;

determining a collection of items that match the search selection to provide matching items, wherein the matching items are items that include said at least one alphanumeric character;

grouping the matching items into one or more buckets, each bucket including one or more items, wherein the grouping comprises, for each bucket, identifying a group of items that share a common alphanumeric characteristic;

selecting one or more representative items from each of the buckets to provide representative items;

presenting the representative items to the user, wherein the representative items assist the user in converging on the one or more desired items, wherein the presenting of the representative items comprises, for each bucket, presenting an index item for each bucket, wherein the index item: (i) comprises an alphanumeric character; (ii) identifies a distinguishing characteristic of the bucket, and (iii) identifies another search selection for the user to enter to narrow the search for the one or more desired items to items; and receiving another search selection that targets one of the buckets, and repeating the determining, grouping, selecting, and presenting with respect to a group of items associated with said one of the buckets.

14. An item discovery storage module including logic configured to implement the computerized method of claim 13.

* * * * *